United States Patent
Magrath

(10) Patent No.: US 10,509,438 B1
(45) Date of Patent: Dec. 17, 2019

(54) APPARATUS, SYSTEM, AND METHOD FOR COUNTER-BALANCING THE WEIGHT OF HEAD-MOUNTED DISPLAYS

(71) Applicant: FACEBOOK TECHNOLOGIES, LLC, Menlo Park, CA (US)

(72) Inventor: Lesley Ribble Magrath, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 69 days.

(21) Appl. No.: 15/495,733

(22) Filed: Apr. 24, 2017

(51) Int. Cl.
  *G06F 1/16* (2006.01)
  *A45F 5/00* (2006.01)

(52) U.S. Cl.
  CPC .............. *G06F 1/163* (2013.01); *A45F 5/00* (2013.01); *G06F 1/1637* (2013.01); *A45F 2005/002* (2013.01)

(58) Field of Classification Search
  CPC ................................ G06F 1/163; A61B 3/145
  USPC ........................................................ 224/181
  See application file for complete search history.

(56) References Cited

U.S. PATENT DOCUMENTS

| | | | | |
|---|---|---|---|---|
| 5,671,037 A | * | 9/1997 | Ogasawara | G02B 27/0176 2/421 |
| 5,844,530 A | * | 12/1998 | Tosaki | G02B 27/017 345/8 |
| 7,484,646 B1 | * | 2/2009 | Holmes | B63C 11/12 2/422 |
| 7,962,972 B2 | * | 6/2011 | Nakabayashi | G02B 27/0176 2/421 |
| 8,245,326 B1 | * | 8/2012 | Tolve | A42B 3/306 2/209.13 |
| 9,517,010 B2 | * | 12/2016 | Beasley | A61B 3/145 |
| 9,927,618 B2 | * | 3/2018 | Allin | G02B 27/0176 |
| 2007/0248238 A1 | * | 10/2007 | Abreu | G02C 3/003 381/381 |
| 2009/0243965 A1 | * | 10/2009 | Price | G02B 27/0176 345/8 |
| 2010/0327028 A1 | * | 12/2010 | Nakabayashi | A42B 1/247 224/162 |
| 2013/0327909 A1 | * | 12/2013 | Freelander | A45F 5/00 248/224.7 |
| 2016/0147072 A1 | * | 5/2016 | Yamazaki | G06F 3/011 345/8 |
| 2017/0337737 A1 | * | 11/2017 | Edwards | F16M 13/04 |

\* cited by examiner

*Primary Examiner* — Derek J Battisti
(74) *Attorney, Agent, or Firm* — FisherBroyles, LLP

(57) ABSTRACT

A removable counter-balance accessory may include a cranial brace that rests against the back of a user's head when the user is wearing a head-mounted display on the user's face. The removable counter-balance accessory may also include an insert that fits in an opening formed by a strap that wraps around the back of the user's head to hold the head-mounted display on the user's face and secures the cranial brace to the strap at the back of the user's head. The removeable counter-balance accessory may further include at least one weight that applies, in connection with the cranial brace at the back of the user's head, a force that at least partially counter-balances the weight of the head-mounted display on the user's face. Various other counter-balance accessories, head-mounted-display systems, and methods are also disclosed.

16 Claims, 12 Drawing Sheets ated into the cranial brace. In addition, the removable counter-balance accessory may include a cushion that is attached to the cranial brace and resides between the cranial brace and the back of the user's head when the user is wearing the head-mounted display.

APPARATUS, SYSTEM, AND METHOD FOR COUNTER-BALANCING THE WEIGHT OF HEAD-MOUNTED DISPLAYS

BACKGROUND

Virtual reality head-mounted displays have applications in a variety of fields, including engineering design, medical surgery practice, military simulated practice, and video gaming. For example, virtual reality head-mounted displays may allow users to experience realistic, immersive virtual environments while playing video games, during flight simulation training, or when interacting with co-workers around the globe.

Unfortunately, due to their weight, traditional head-mounted displays may cause a certain degree of discomfort and/or awkwardness when worn. For example, since users typically wear head-mounted displays over their eyes, such head-mounted displays may weigh down the front of the users' heads relative to the back of the users' heads. Specifically, a head-mounted display may place a forward-leaning force on a user's head, thereby causing the user to tip his or her head forward or otherwise placing strain on the user's neck. While the user may counteract that force by holding his or her head still, this can be a very strenuous exercise for the user, especially when done for long periods of time.

In addition, the weight of traditional head-mounted displays may necessitate heavy-duty restraints to maintain a certain positioning when worn. For example, a user may wear a strap around his or her head to hold a head-mounted display in the correct position on his or her face. In this example, the strap may need to withstand a significant amount of force introduced by the head-mounted display in order to hold the head-mounted display in a desired position.

SUMMARY

As will be described in greater detail below, the instant disclosure generally relates to apparatuses, systems, and methods for counter-balancing the weight of head-mounted displays. In some embodiments, a removable counter-balance accessory may include a cranial brace that rests against the back of a user's head when the user is wearing a head-mounted display on the user's face. The removable counter-balance accessory may also include an insert that both fits in an opening formed by a strap, which wraps around the back of the user's head to hold the head-mounted display on the user's face, and secures the cranial brace to the strap at the back of the user's head. The removeable counter-balance accessory may further include at least one weight that applies, in connection with the cranial brace at the back of the user's head, a force that at least partially counter-balances the weight of the head-mounted display on the user's face.

In some examples, at least a portion of the weight may be integrated into the cranial brace. Additionally or alternatively, at least a portion of the weight may be integrated into the insert. In other examples, the weight may include and/or represent a removable unit that is held at the back of the user's head by the cranial brace and/or the insert. For example, the weight may include and/or represent a weighted object, a battery, and/or an electronics assembly.

In some examples, the cranial brace and the insert may attach to one another by way of an attachment mechanism. In such examples, the cranial brace and the insert may reside on opposite sides of the strap when attached to each other by way of the attachment mechanism. In one example, the insert may include at least one raised segment, and the cranial brace may include at least one recess dimensioned to house the raised segment of the insert when the cranial brace and the insert are attached to each other by way of the attachment mechanism. The attachment mechanism may include and/or represent a magnetic fastener, a hook-and-loop fastener, a snap fastener, and/or a lock.

In some examples, the insert may be integrated into the cranial brace. In addition, the removable counter-balance accessory may include a cushion that is attached to the cranial brace and resides between the cranial brace and the back of the user's head when the user is wearing the head-mounted display.

A corresponding head-mounted-display system may include a head-mounted display and a strap that is coupled to the head-mounted display and wraps around the back of a user's head when the user is wearing the head-mounted display. The head-mounted-display system may also include a removable counter-balance accessory. This removable counter-balance accessory may include a cranial brace that rests against the back of the user's head when the user is wearing the head-mounted display on the user's face. This removable counter-balance accessory may also include an insert that fits in an opening formed by the strap and secures the cranial brace to the strap at the back of the user's head. The head-mounted-display system may further include at least one weight that applies, in connection with the cranial brace at the back of the user's head, a force that at least partially counter-balances the weight of the head-mounted display on the user's face.

In one embodiment, a method for assembling a counter-balance accessory to a head-mounted display may include (a) placing an insert in an opening formed by a strap that is coupled to a head-mounted display, (b) attaching, to the insert, a cranial brace that rests against the back of a user's head when the user is wearing the head-mounted display on the user's face, and then (c) applying, by way of a weight that is incorporated into the cranial brace and/or the insert, a force that at least partially counter-balances the weight of the head-mounted display on the user's face.

Various advantages of the present application will be apparent in light of the descriptions below.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures and description.

DETAILED DESCRIPTION OF EXEMPLARY EMBODIMENTS

Figure 1:
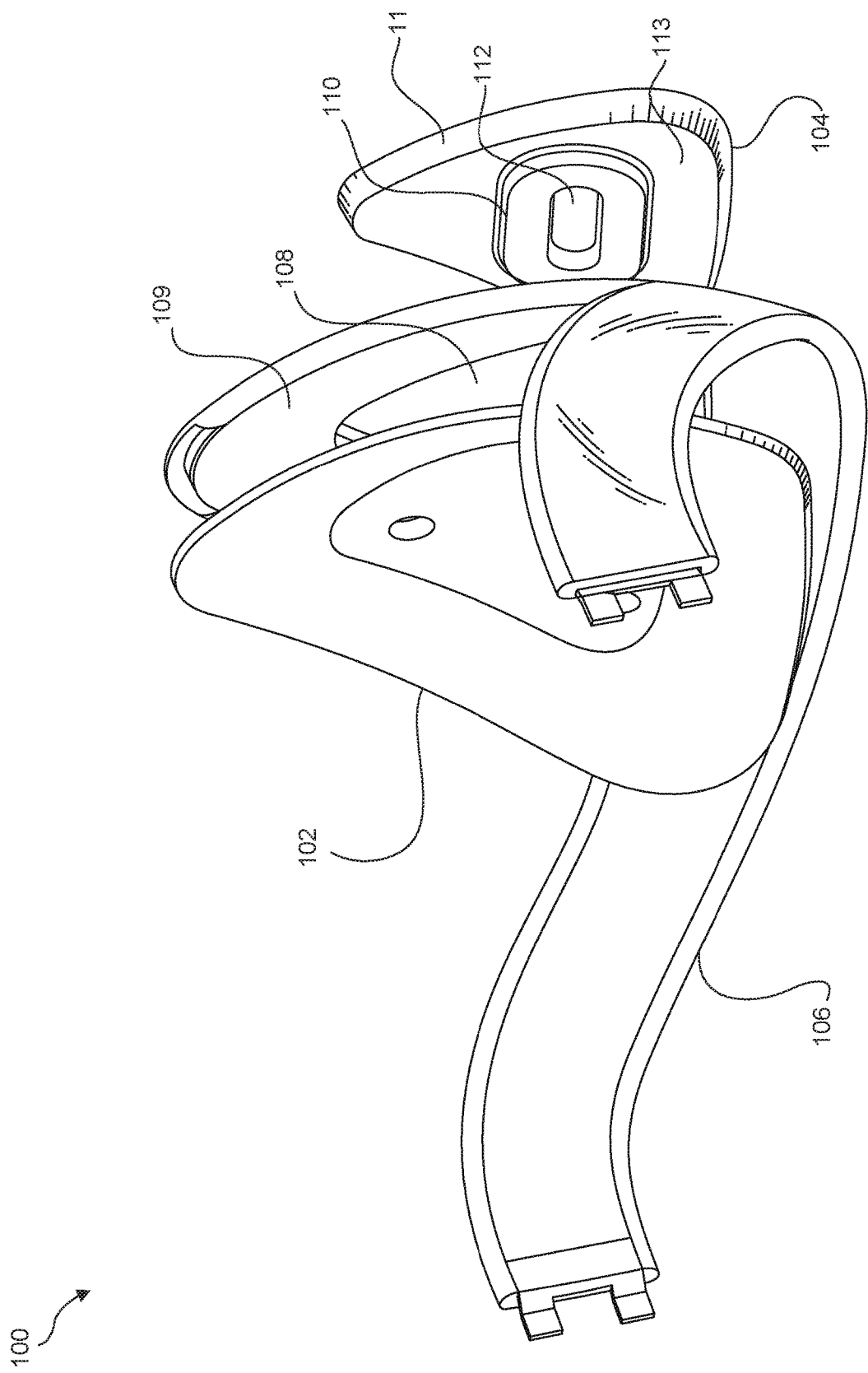
FIG. 1 is an exploded view of an exemplary removable counter-balance accessory and strap for a head-mounted-display system in accordance with some embodiments.

The present disclosure describes various removable counter-balance display accessories, head-mounted-display systems, and methods for assembling counter-balance accessories to head-mounted displays. As will be explained in greater detail below, embodiments of the instant disclosure may enable weights and/or weighted features of a removable accessory to counter-balance the weight of a head-mounted display worn by a user. For example, a removable counter-balance accessory may include both a cranial brace and an insert secured to a strap on a head-mounted-display system. In this example, the user may attach the cranial brace to the strap on the head-mounted-display system by way of the insert. When the user wraps the strap around the back of his or her head to put on and/or wear the head-mounted display, the cranial brace may rest against the back of the user's head.

Continuing with this example, the removable counter-balance accessory may include and/or incorporate some form of weighting feature that, when the user is wearing the head-mounted display on his or her face, counter-balances the weight of the head-mounted display. This weighting feature may be accomplished in a variety of ways. For example the cranial brace, the insert, and/or an additional object (such as a simple weight, a battery, and/or an electronics assembly) may serve as a weighting feature that weighs down the removable counter-balance accessory.

By applying weight to the back of the user's head in this way, embodiments of the instant disclosure may improve the comfort level of the user. For example, the disclosed removable counter-balance accessory may mitigate and/or counteract the force placed on the front of the user's face by the weight of the head-mounted display. As a result, the removable counter-balance accessory may prevent the head-mounted display from causing the user's head to tip forward and/or necessitating so much restraint from the user to hold his or her head still when wearing the head-mounted display, thereby potentially making the user's virtual reality experience more enjoyable and/or less strenuous.

As another example, embodiments of the instant disclosure may involve attaching and/or integrally forming a cushion to the removable counter-balance accessory. In this example, the cushion may rest between the cranial brace of the removable counter-balance accessory and the user's head to provide improved comfort to the user when wearing the head-mounted display. Additionally or alternatively, if the user's head is too small to safely and/or correctly wear the head-mounted-display system without modification, this cushion may effectively close the gap between the user's head and the strap or removable counter-balance accessory. In doing so, the user may achieve an improved fit that enables him or her to safely and/or correctly wear or use the head-mounted display.

In addition, embodiments of the instant disclosure may decrease the need for heavy-duty restraints and/or straps on head-mounted-display systems. For example, to maintain the positioning of head-mounted displays on users' faces, traditional head-mounted-display systems often rely on heavy-duty restraints that can withstand the significant amount of force introduced by head-mounted displays. However, by counter-balancing the load from head-mounted displays, the disclosed embodiments may help maintain head-mounted displays in the correct position on users' faces without as much need for such heavy-duty restraints.

Reference will now be made to various exemplary embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known systems, methods, procedures, components, circuits, and networks have not been described in detail so as not to unnecessarily obscure aspects of the embodiments.

The following will provide, with reference to FIGS. 1-11, detailed descriptions of exemplary removable counter-balance accessories and head-mounted-display systems. Detailed descriptions of corresponding methods for assembling counter-balance accessories to head-mounted displays will also be provided in connection with FIG. 12.

Figure 11:
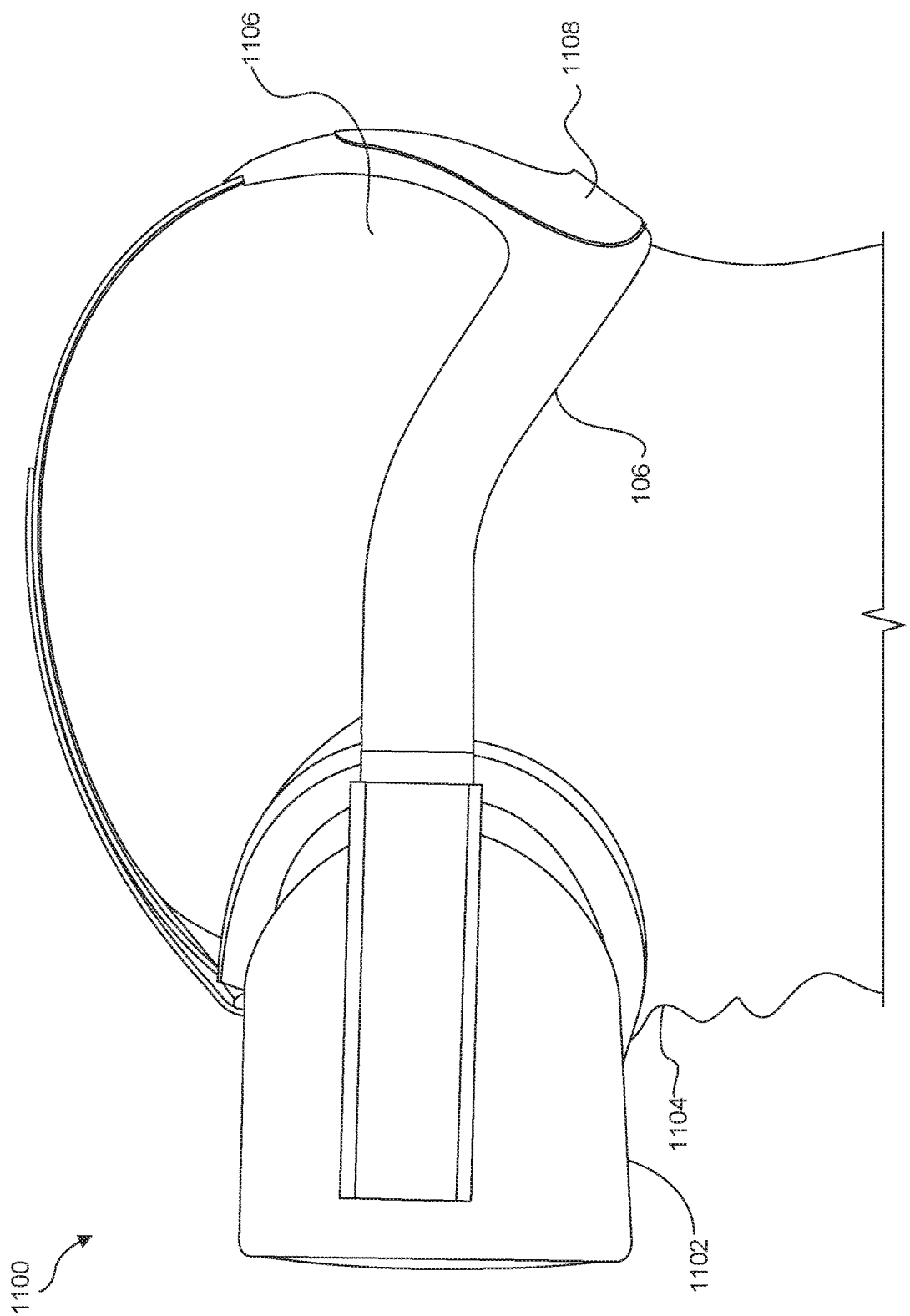
FIG. 11 is a perspective view of an exemplary head-mounted-display system in accordance with some embodiments.

FIG. 1 is an exploded view of an exemplary apparatus 100 for counter-balancing the weight of head-mounted displays in accordance with some embodiments. As illustrated in FIG. 1, apparatus 100 may include a cranial brace 102, an insert 104, and a strap 106 that defines or forms an opening 108. In one example, cranial brace 102 and insert 104 may together represent a removable counter-balance accessory (to the exclusion of strap 106). The term "cranial brace," as used herein, generally refers to any physical support, piece, and/or part configured to rest against and/or interface with the back of a user's head. In one example, cranial brace 102 may rest against the back of a user's head when the user is wearing a head-mounted display connected to strap 106 (as illustrated in FIG. 11).

Cranial brace 102 may include and/or incorporate a variety of different materials. In some examples, at least a portion of these materials may serve as weights. For example, cranial brace 102 may include and/or incorporate one or more heavy materials, such as metals (e.g., steel, iron, copper, brass, and/or bronze), that serve as weights. Additionally or alternatively, cranial brace 102 may incorporate and/or include weighted objects, batteries, electronics assemblies (e.g., electronic components required by a head-mounted display), variations or combinations of one or more of the same, and/or any other suitable weights.

For example, cranial brace 102 may include and/or incorporate steel. In this example, the steel may be integrated into cranial brace 102. The steel may serve to weigh down cranial brace 102 such that, when the user wears a head-mounted display (not illustrated in FIG. 1) connected to strap 106, cranial brace 102 applies a downward force at the back of the user's head. This force at the back of the user's head may at least partially counter-balance the weight of the head-mounted display on the user's face.

The term "insert," as used herein, generally refers to any physical piece and/or part configured to fit in and/or be inserted into an opening. In one example, at least a portion of insert 104 may fit in and/or be inserted into opening 108 of strap 106. In this example, insert 104 may, when attached to cranial brace 102 (as explained in greater detail below), effectively secure cranial brace 102 and insert 104 to strap 106 such that, when the user wears the head-mounted display connected to strap 106, cranial brace 102 is held in place against the back of the user's head.

Like cranial brace 102, insert 104 may include and/or incorporate a variety of different materials. In some examples, at least a portion of these materials may serve as weights. For example, insert 104 may include and/or incorporate one or more heavy materials, such as metals (e.g., steel, iron, copper, brass, and/or bronze), that serve as weights. Additionally or alternatively, insert 104 may incorporate and/or include weighted objects, batteries, electronics assemblies (e.g., electronic components required by a head-mounted display), variations or combinations of one or more of the same, and/or any other suitable weights. For example, insert 104 may include and/or incorporate steel. In this example, the steel may be integrated into insert 104. The steel may serve to weigh down insert 104 such that, when the user wears a head-mounted display connected to strap 106, insert 104 applies a downward force at the back of the user's head. As with cranial brace 102, this force at the back of the user's head may at least partially counter-balance the weight of the head-mounted display on the user's face.

The term "strap," as used herein, generally refers to any type or form of material, system, mechanism, and/or harness that serves to hold and/or secure a head-mounted display on a user's face. In one example, strap 106 may include one or more flexible pieces of material that are coupled to the head-mounted display. In this example, strap 106 may wrap around the back of the user's head when the user is wearing the head-mounted display on his or her face. Strap 106 may hold and/or secure the head-mounted display in position on the user's face such that the user is able to experience virtual content presented via the head-mounted display in a hands-free way.

As detailed above, apparatus 100 may apply, at the back of a user's head, a force that at least partially counter-balances the weight of a head-mounted display on the user's face. Accordingly, one or more portions of apparatus 100 may serve as a weight that applies this counter-balancing force at the back of the user's head. Apparatus 100 may serve as a weight in a variety of different ways. In one example, a weight may be integrated into cranial brace 102. Additionally or alternatively, a weight may be integrated into insert 104.

Additionally or alternatively, apparatus 100 may include a separate weight (not illustrated in FIG. 1) apart from cranial brace 102 and insert 104. In one example, this weight may represent a removeable unit that is held at the back of the user's head by cranial brace 102 and/or insert 104. For example, cranial brace 102 and insert 104 may attach to each other around or about strap 106. Cranial brace 102 and insert 104 may reside on opposite sides of 106 when attached to each other in this way. In this example, cranial brace 102 and insert 104 may surround and/or encase a separate, removable weight (not illustrated), thereby holding the weight at the back of the user's head.

Various kinds of separate weights may be used in the removable counter-balance accessory. Examples of such weights include, without limitation, simple weights, weighted objects, batteries, electronics assemblies (e.g., electronic components required by head-mounted displays), variations or combinations of one or more of the same, and/or any other suitable weights.

In some examples, the removable counter-balance accessory may include an attachment mechanism that enables cranial brace 102 and insert 104 to attach to one another around or about strap 106. For example, the removable counter-balance accessory may include a magnetic fastener (which may include, e.g., at least one coupling magnet and/or ferromagnetic material) that facilitates attachment by way of a magnetic field. In this example, one side of the magnetic fastener may be integrated into cranial brace 102, and another side of the magnetic fastener may be integrated into insert 104. Additional examples of such attachment mechanisms include, without limitation, hook-and-loop fasteners, snap fasteners, locks, adhesives, pins, screws, levers, joints, ties, clamps, clasps, stitches, staples, zippers, variations or combinations of one or more of the same, and/or any other suitable attachment means.

Although illustrated as separate pieces in FIG. 1, cranial brace 102 and insert 104 may represent different portions of a single structure and/or component in other embodiments. For example, insert 104 may be integrated into cranial brace 102. Alternatively, cranial brace 102 may be integrated into insert 104. In either case, cranial brace 102 and insert 104 may form a single inseparable unit in this embodiment.

In some examples, the removable counter-balance accessory may include a cushion designed to provide an additional level of comfort to the user wearing the head-mounted display. In one example, the cushion may be integrally formed with cranial brace 102. In another example, the cushion may be removably attached to cranial brace 102. In either example, the cushion may reside between the head-facing side of cranial brace 102 and the back of the user's head when the user is wearing the head-mounted display.

In some embodiments, the cushion may include and/or be formed from a pliable material. For example, the cushion may include and/or be formed from a foam material (e.g., polyurethane foam) and/or any other pliable material that is suitable for making contact with and/or conforming to the back of a user's head. This pliable material may also enable the cushion to be flattened or otherwise conformed to a desired shape.

In addition to providing improved comfort to the user, the cushion may also serve other purposes. As an example, the cushion may modify the fit of strap 106 and/or the removable counter-balance accessory with respect to the user's head. For example, the user's head may be too small to safely and/or correctly wear the head-mounted display without some sort of modification. In this example, the smallest setting of strap 106 may be too big for the user's head. In other words, the user may be unable to tighten strap 106 sufficiently around his or her head to maintain the head-mounted display in the correct position on his or her face.

In this situation, the user may insert and/or apply the cushion to the removable counter-balance accessory to effectively close the gap between the user's head and strap 106 and/or between the user's head and the removable counter-balance accessory. In doing so, the user may achieve an improved fit that enables him or her to safely and/or correctly wear or use the head-mounted display.

Figure 2:
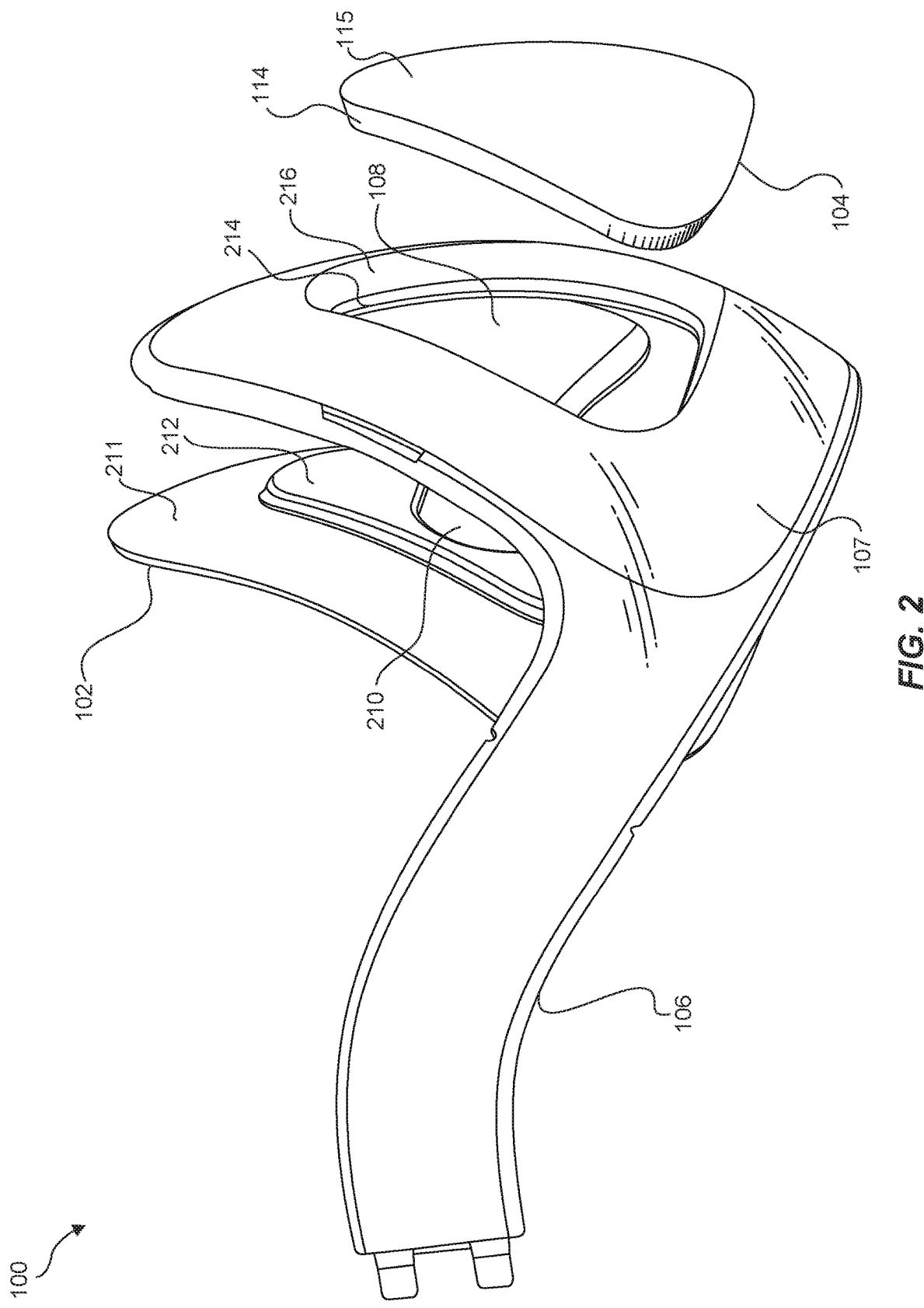
FIG. 2 is an additional exploded view of the exemplary removable counter-balance accessory and strap illustrated in FIG. 1.

FIG. 2 is another exploded view of exemplary apparatus 100. As illustrated in FIG. 2, strap 106 may define and/or form opening 108. In one example, opening 108 may be dimensioned to accept and/or receive insert 104. In this example, opening 108 may represent an absence, a vacancy, an empty space, and/or a receptacle made by strap 106. In other words, portions of strap 106 may create boundaries around which opening 108 is formed.

In some examples, portions of cranial brace 102, insert 104, and/or strap 108 may include various mechanical features that, when assembled, may provide tension and/or structural integrity to apparatus 100. As a result of this tension and/or structural integrity, insert 104 and cranial brace 102 may be successfully held and/or secured to strap 106 at the back of the user's head. For example, and as illustrated in FIG. 2, cranial brace 102 may include a raised portion 212 that is dimensioned to interface with opening 108 defined in strap 106. In one example, at least part of raised portion 212 may be dimensioned in a manner that corresponds to the size and shape of opening 108 defined in strap 106. Specifically, raised portion 212 may be dimensioned so that at least part of raised portion 212 may be inserted into opening 108. In this example, when raised portion 212 is inserted into opening 108, a rear-facing surface 211 of cranial brace 102 may rest against a head-facing surface 109 (see FIG. 1) of strap 106, thereby preventing further insertion of raised portion 212 into opening 108. This interface of rear-facing surface 211 of cranial brace 102 with head-facing surface 109 of strap 106 may, together with the insertion of raised portion 212 into opening 108, increase the structural integrity of the mechanical coupling of cranial brace 102 to strap 106.

As illustrated in FIG. 2, strap 106 may also include a tapered side wall 216 that defines opening 108. In one example, tapered side wall 216 may taper inwards towards head-facing side 109 of strap 106. In this example, tapered side wall 216 may be dimensioned to receive and/or hold the generally triangular shape of insert 104 (which may also include a corresponding tapered side wall 114) when insert 104 is inserted into opening 108. In some examples, tapered side wall 216 may be dimensioned to ensure that, due to interfacing with corresponding tapered side wall 114 of insert 104, insert 104 can only be inserted within opening 108 to a preferred depth. For example, tapered side wall 216 of strap 106 and corresponding tapered side wall 114 of insert 104 may be dimensioned to ensure that, when insert 104 is fully inserted into opening 108, a rear-facing surface 115 of insert 104 lays flush with a rear-facing surface 107 of strap 106. Additionally or alternatively, strap 106 may include a lip 214 dimensioned to prevent insert 104 from being inserted into opening 108 past a preferred depth (due to, e.g., interfacing with the edges of head-facing side 113 (see FIG. 1) of insert 104).

Insert 104 may interface with cranial brace 102 in a variety of ways. In some examples, insert 104 may include a raised segment 110 that interfaces with a recess (see, e.g., recess 210 in FIG. 2) defined in cranial brace 102. In such examples, recess 210 in cranial brace 102 may house and/or receive raised segment 110 of insert 104 when cranial brace 102 and insert 104 are attached to each other (e.g., when raised portion 212 of cranial brace 102 is inserted into opening 108 of strap 106 and raised segment 110 of insert 104 is inserted into recess 210 of cranial brace 102 through opening 108 of strap 106).

Figure 3:
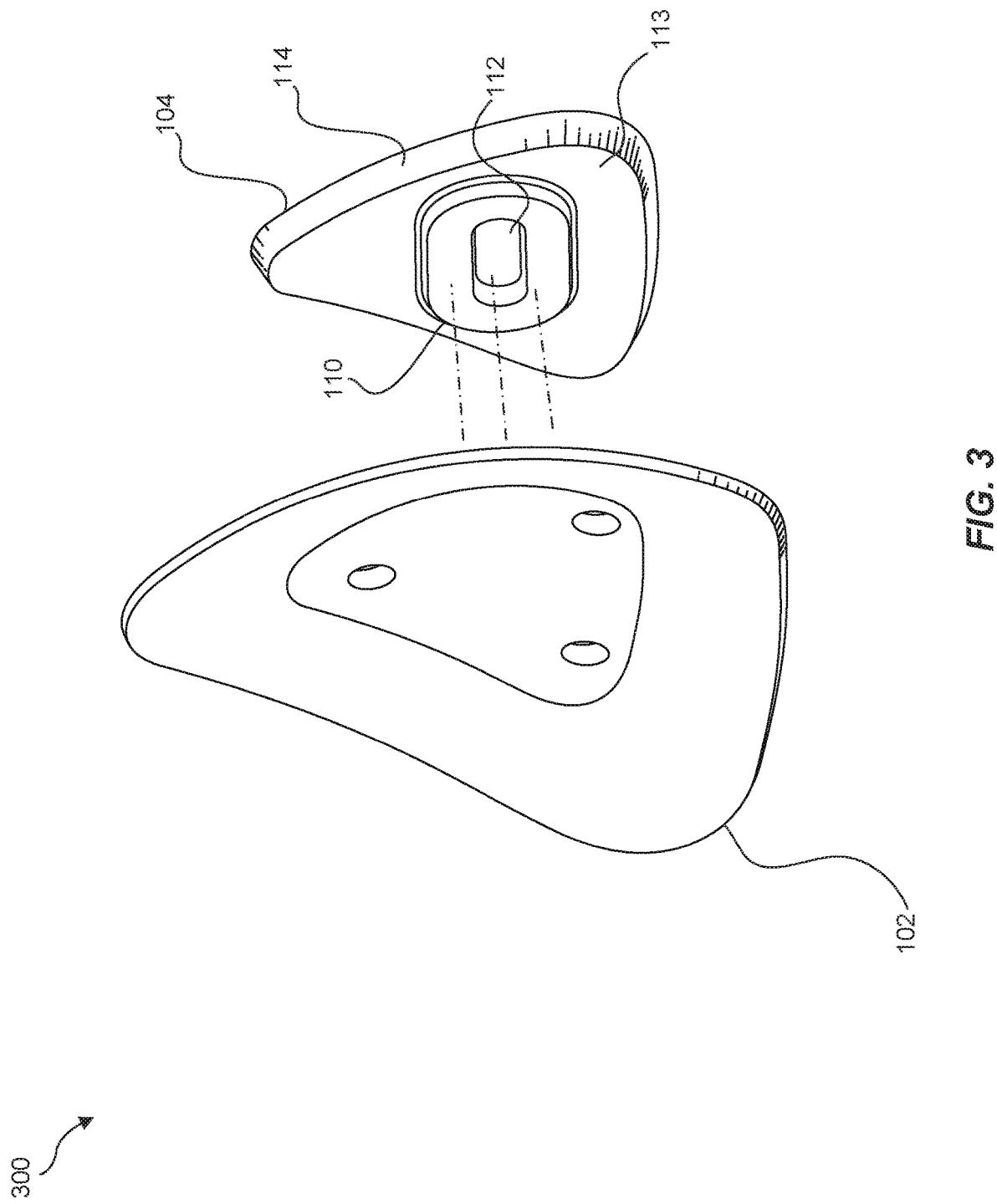
FIG. 3 is an exploded view of an exemplary removable counter-balance accessory for a head-mounted-display system in accordance with some embodiments.
Figure 4:
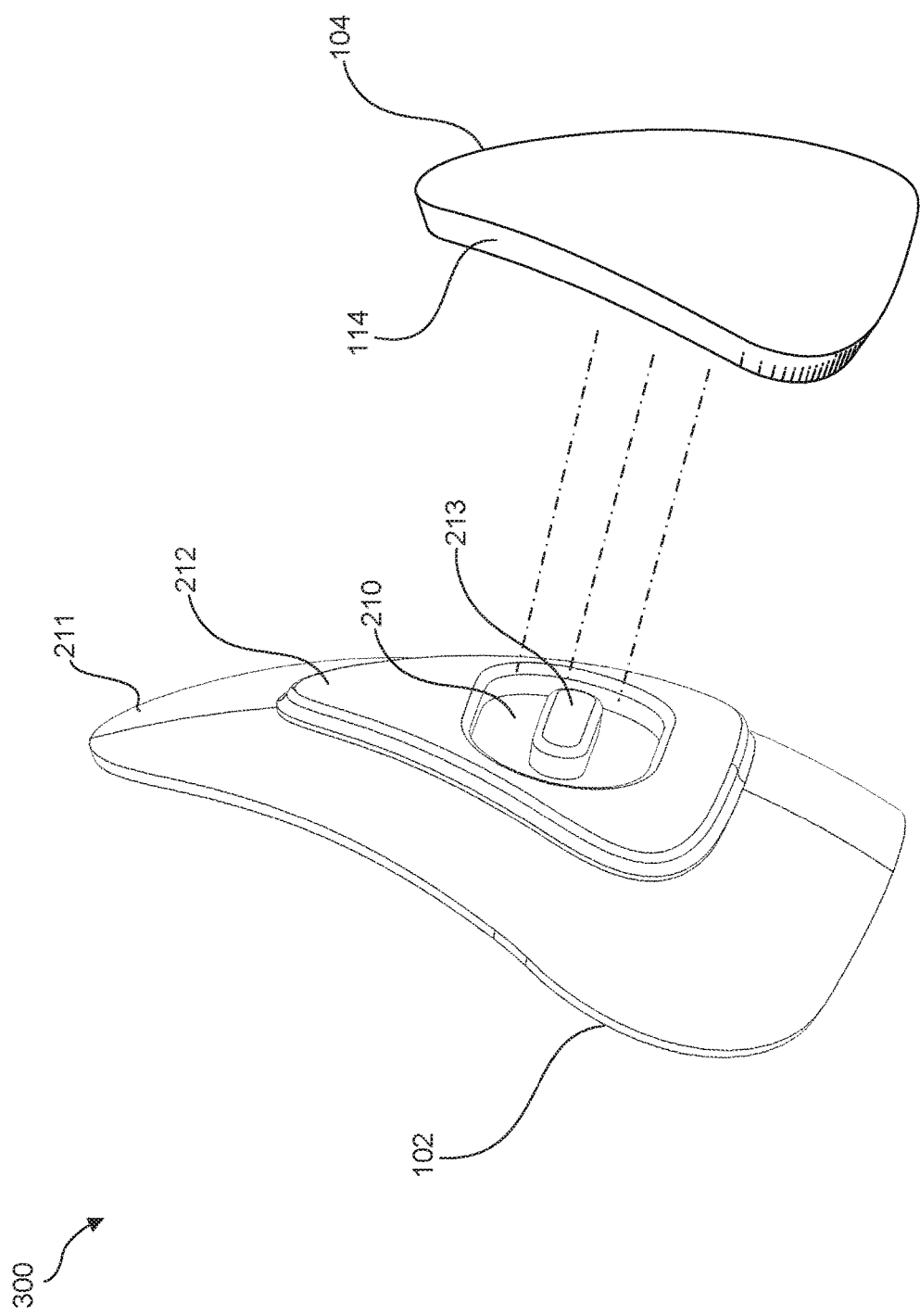
FIG. 4 is an additional exploded view of the exemplary removable counter-balance accessory illustrated in FIG. 3.
Figure 5:
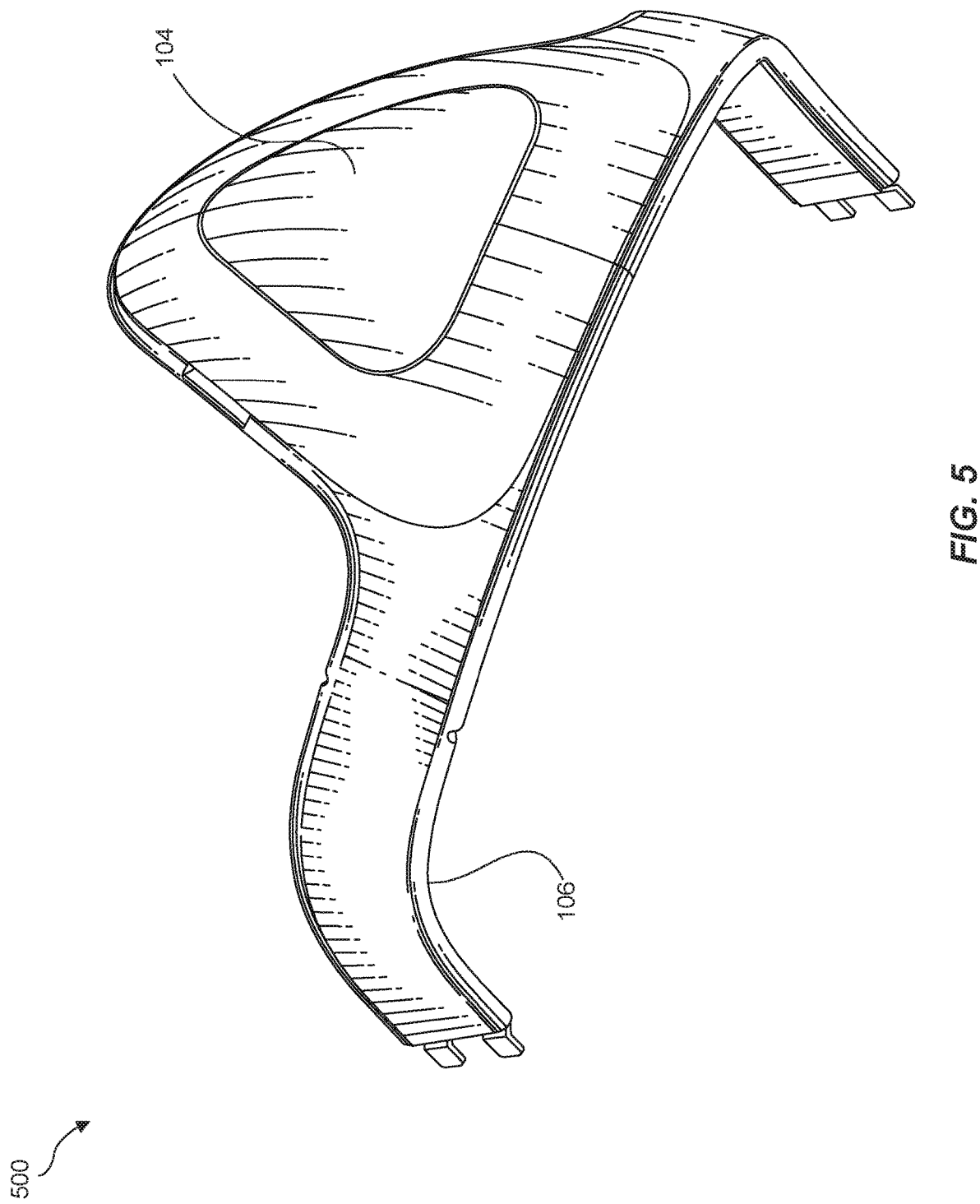
FIG. 5 is a perspective view of an exemplary removable counter-balance accessory and strap for a head-mounted-display system in accordance with some embodiments.
Figure 6:
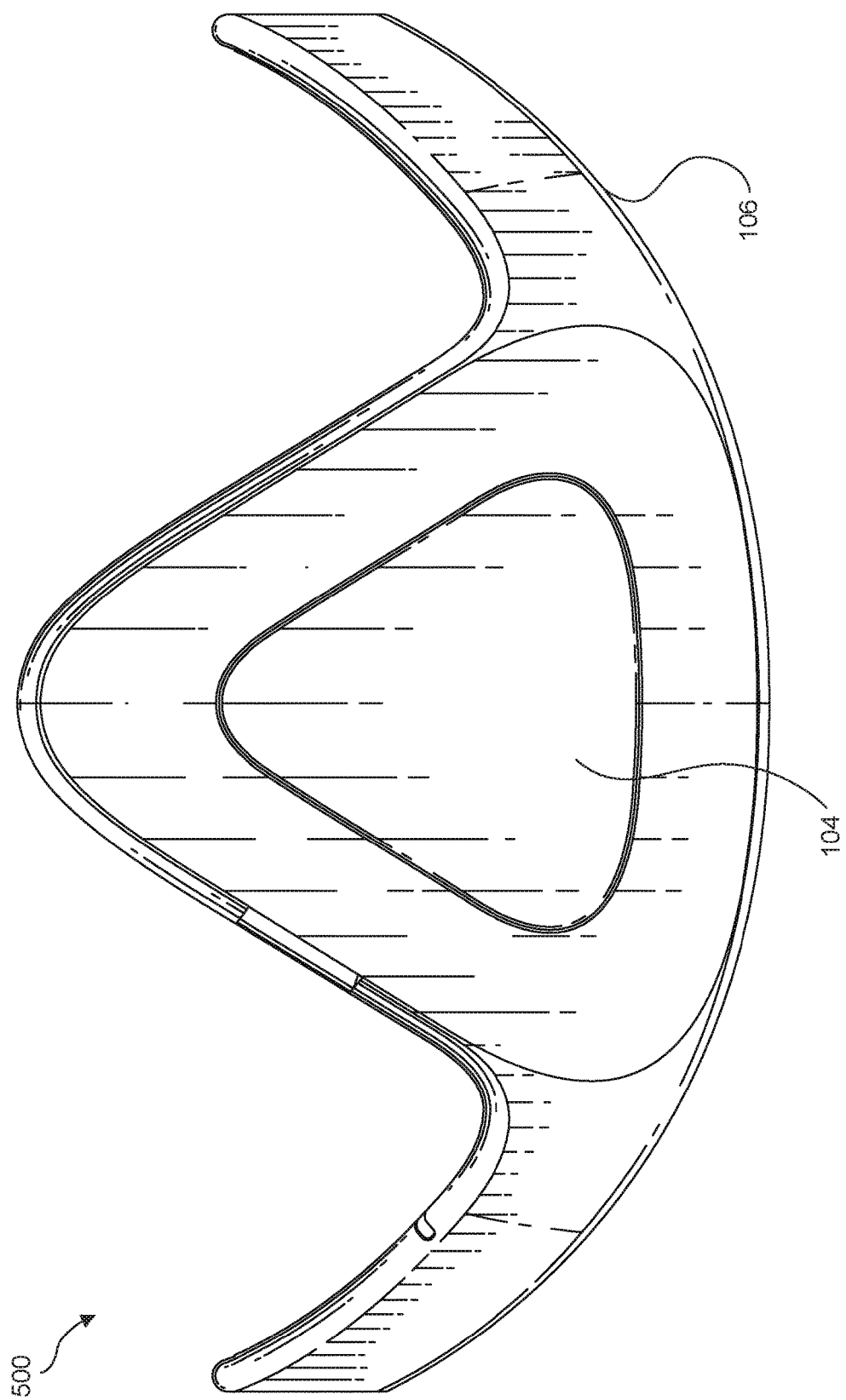
FIG. 6 is an additional perspective view of the exemplary removable counter-balance accessory and strap illustrated in FIG. 5.
Figure 7:
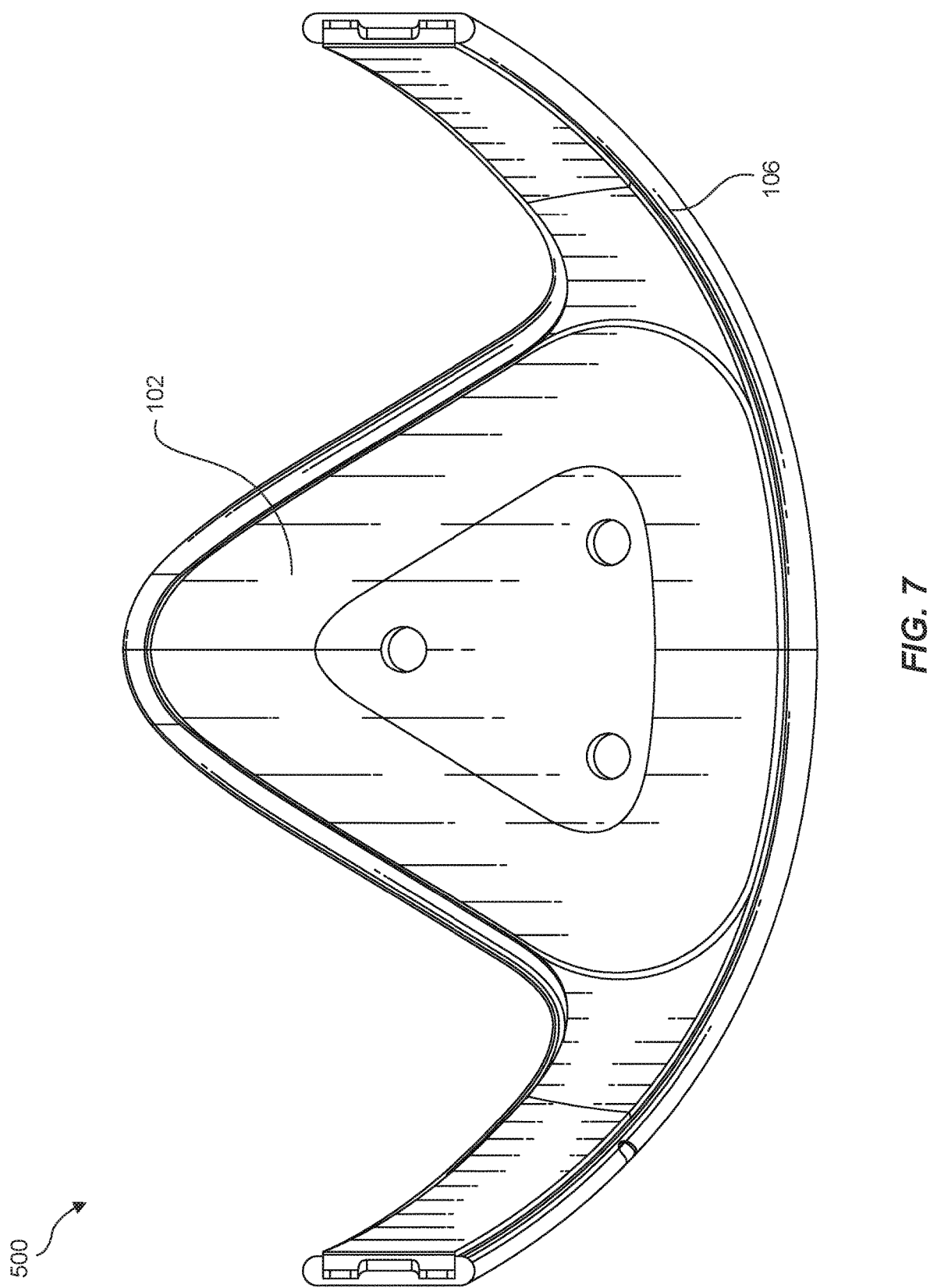
FIG. 7 is an additional perspective view of the exemplary removable counter-balance accessory and strap illustrated in FIG. 5.
Figure 8:
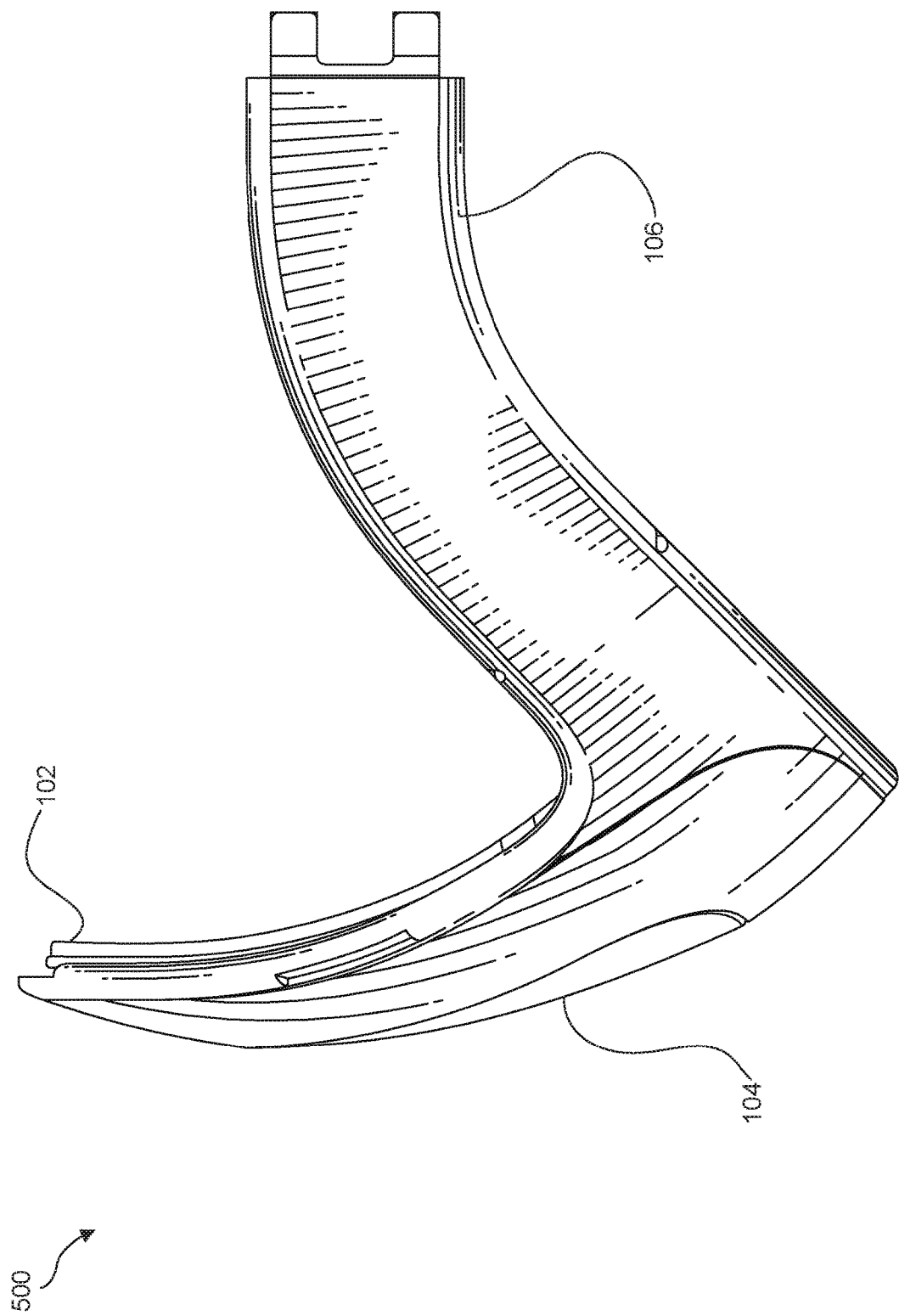
FIG. 8 is an additional perspective view of the exemplary removable counter-balance accessory and strap illustrated in FIG. 5.
Figure 9:
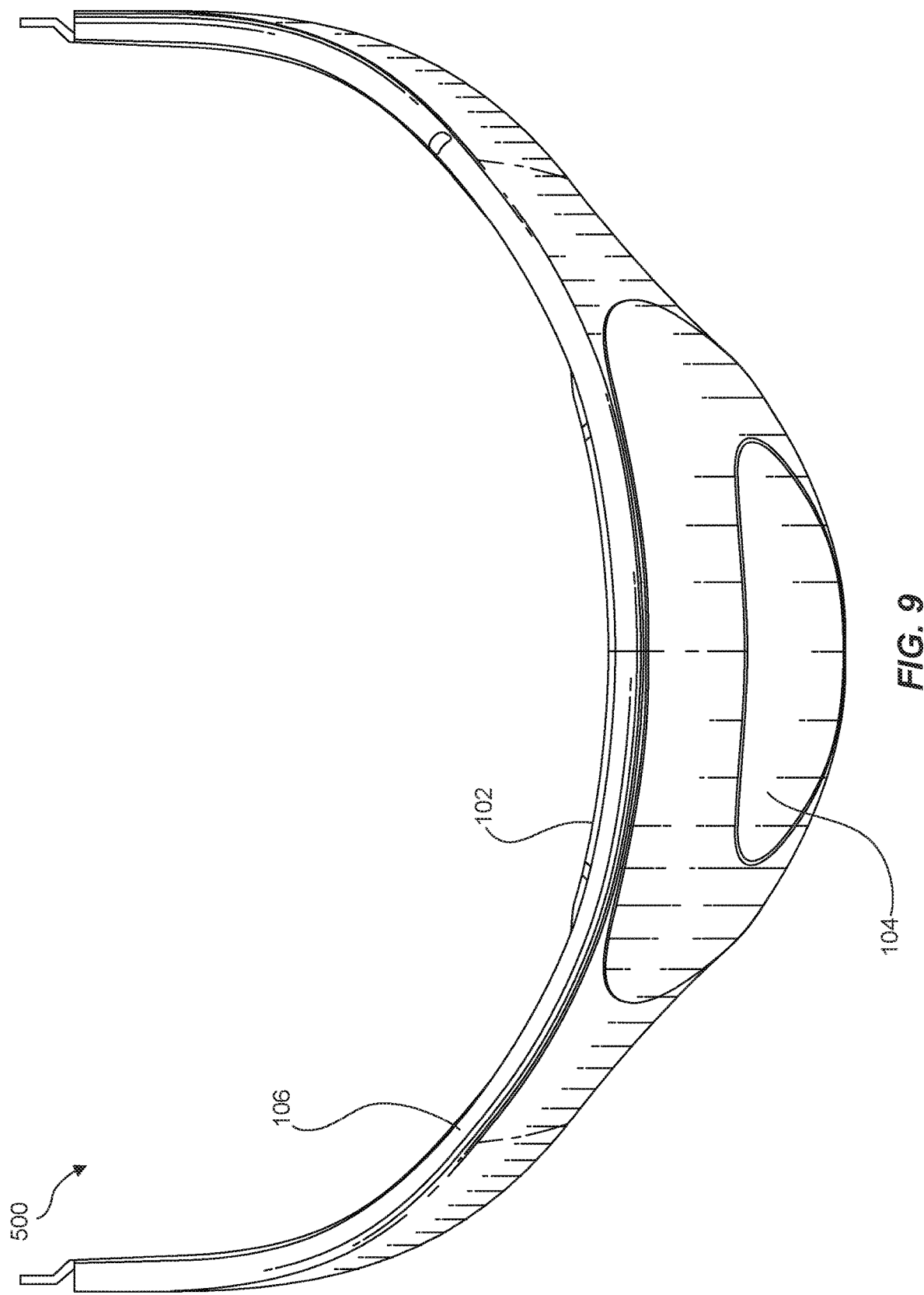
FIG. 9 is an additional perspective view of the exemplary removable counter-balance accessory and strap illustrated in FIG. 5.
Figure 10:
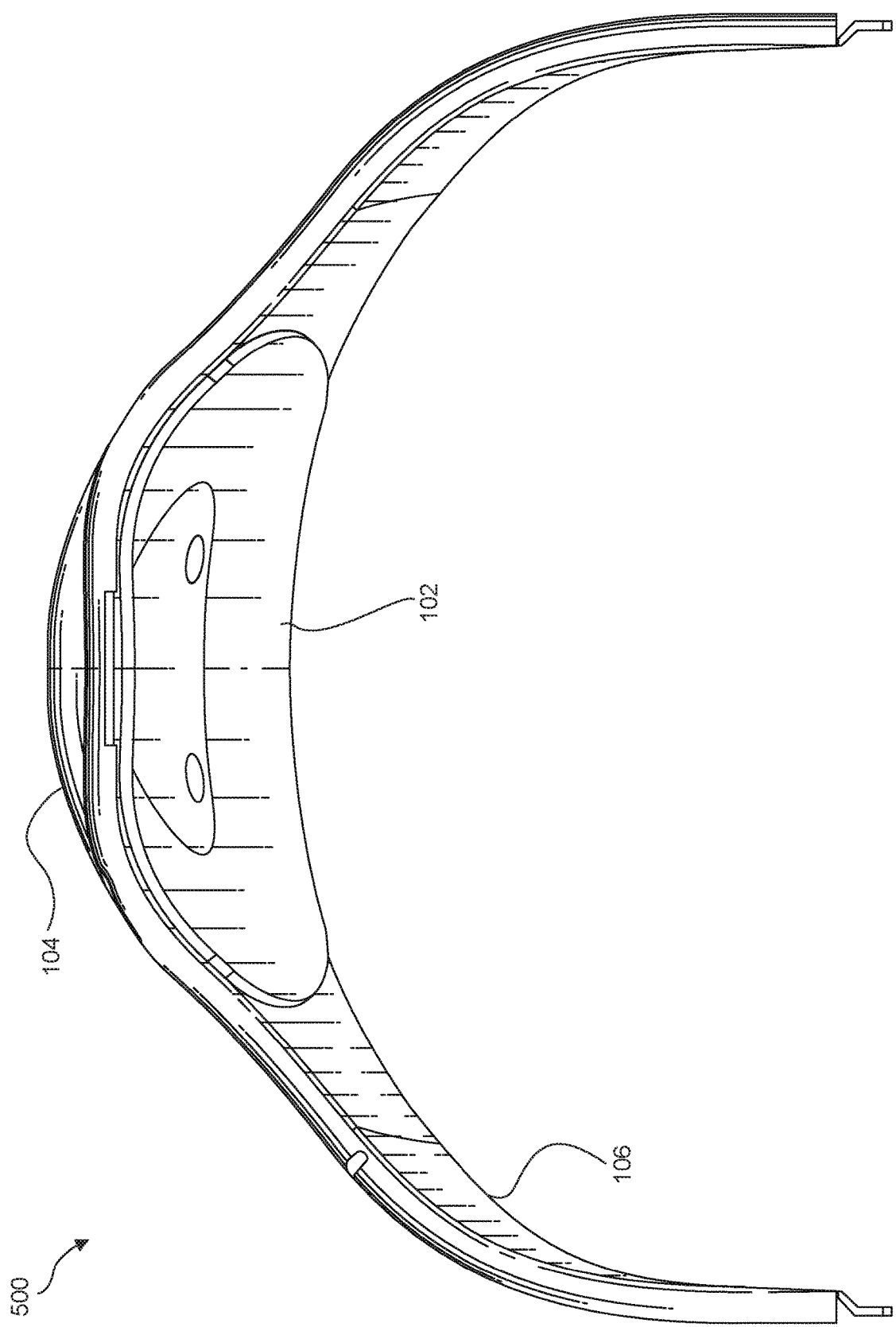
FIG. 10 is an additional perspective view of the exemplary removable counter-balance accessory and strap illustrated in FIG. 5.

In some embodiments, and as illustrated in the exploded perspective views of FIGS. 3-4, a protrusion 213 may also be disposed within recess 210 defined in raised portion 212 of cranial brace 102. In these embodiments, protrusion 213 may be dimensioned to fit within a corresponding recess 112 defined within raised segment 110 of insert 104. Together with the insertion of raised segment 110 of insert 104 into recess 210 defined in cranial brace 102, the insertion of protrusion 213 of cranial brace 102 into recess 112 of insert 104 may provide tension to and/or increase the structural integrity of the mechanical coupling of cranial brace 102 to insert 104.

In alternative examples, the locations of the various raised portions and/or recesses defined or provided on cranial brace 102 and/or insert 104 may be swapped with respect to cranial brace 102 and insert 104. For example, although not illustrated in this way in FIG. 1, raised segment 110 (along with recess 112) may be disposed on raised portion 212 of cranial brace 102 instead of on head-facing side 113 of insert 104. Similarly, recess 210 and protrusion 213 may be defined within or disposed on head-facing side 113 of insert 104 instead of on/within raised portion 212 of cranial brace 102.

Strap 106, cranial brace 102, and insert 104 may be defined or formed in a variety of shapes and sizes. For example, while opening 108 of strap 106, raised portion 212 of cranial brace 102, and insert 104 are illustrated in FIGS. 1-2 as having substantially triangular shapes, these elements may also be formed in a variety of additional shapes or sizes, including substantially rectangular shapes, substantially square shapes, substantially oval shapes, etc. Likewise, while recess 210 of raised portion 212 of cranial brace 102 and raised segment 110 and recess 112 of insert 104 are illustrated in FIGS. 3-4 as having substantially rectangular shapes with rounded corners, these elements may also be formed in a variety of additional shapes or sizes, including substantially triangular shapes, substantially square shapes, substantially oval shapes, etc.

FIGS. 5-10 are perspective views of an exemplary apparatus 500 for counter-balancing the weight of head-mounted displays in accordance with some embodiments. As illustrated in these figures, apparatus 500 may include cranial brace 102, insert 104, and strap 106 that couples to a head-mounted display (not illustrated). In this example, cranial brace 102 and insert 104 may be attached to one another by way of opening 108 of strap 106. Strap 106 may wrap around the back of a user's head to hold the head-mounted display on the user's face (as illustrated in FIG. 11).

FIG. 11 is a perspective view of an exemplary head-mounted-display system 1100 in accordance with some embodiments. As illustrated in FIG. 11, head-mounted-display system 1100 may include strap 106 coupled to a head-mounted display 1102. In this example, head-mounted-display system 1100 may also include a removable counter-balance accessory 1108 that is secured to and/or inserted in an opening of strap 106. The term "head-mounted display," as used herein, generally refers to any type or form of display device or system that is worn on or about a user's face and displays visual content to the user. Head-mounted displays may display content in any suitable way, including via a screen (e.g., an LCD or LED screen), a projector, a cathode ray tube, an optical mixer, etc. Head-mounted displays may display content in one or more media formats. For example, a head-mounted display may display video, photos, and/or computer-generated imagery (CGI).

Head-mounted displays may provide diverse and distinctive user experiences. Some head-mounted displays may provide virtual-reality experiences (i.e., they may display computer-generated or pre-recorded content), while other head-mounted displays may provide real-world experiences (i.e., they may display live imagery from the physical world). Head-mounted displays may also provide any mixture of live and virtual content. For example, virtual content may be projected onto the physical world (e.g., via optical or video see-through), which may result in augmented reality or mixed reality experiences.

Head-mounted displays may be configured to be mounted to a user's head in a number of ways. Some head-mounted displays may be incorporated into glasses or visors. Other head-mounted displays may be incorporated into helmets, hats, or other headwear. Examples of head-mounted displays may include OCULUS RIFT, GOOGLE GLASS, VIVE, SAMSUNG GEAR, etc.

As illustrated in FIG. 11, a user may place head-mounted-display system 1100 on the user's head such that head-mounted display 1102 is positioned and/or rests on the user's face 1104. By placing head-mounted-display system 1100 on his or her face 1104 in this way, the user may situate head-mounted display 1102 over his or her eyes to experience and/or view virtual content presented on head-mounted display 1102. The user may also secure head-mounted display 1102 in the correct position by wrapping strap 106 around the back of the user's head 1106.

In some examples, removable counter-balance accessory 1108 may include cranial brace 102 and insert 104 (and optionally an additional weighted object). In these examples, cranial brace 102 and insert 104 may be attached to one another by way of opening 108 of strap 106.

In one example, removable counter-balance accessory 1108 may include and/or represent a weight that applies a downward force at the back of the user's head 1106. This weight may be applied in connection with and/or by way of cranial brace 102, insert 104, and/or a stand-alone weighted object.

Figure 12:
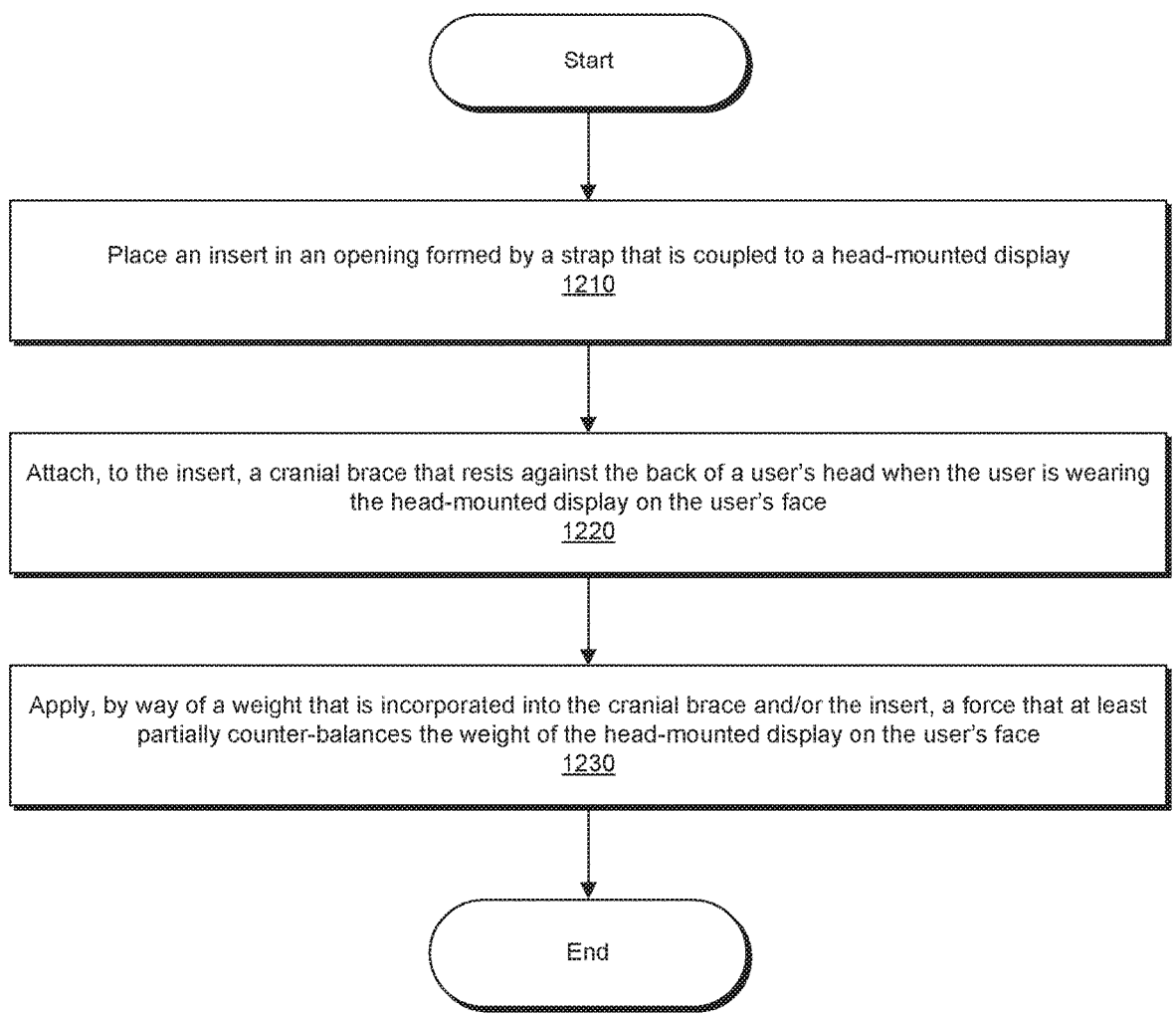
FIG. 12 is a flow diagram of an exemplary method for assembling counter-balance accessories to head-mounted displays.

FIG. 12 is a flow diagram of an exemplary method 1200 for assembling a counter-balance accessory to a head-mounted display according to any of the embodiments disclosed herein. The steps shown in FIG. 12 may be performed by an individual and/or by any suitable manual and/or automated apparatus.

As illustrated in FIG. 12, at step 1210, an insert may be placed in an opening formed by a strap that is coupled to a head-mounted display. For example, a user may place insert 104 into opening 108 formed by strap 106 that is coupled to head-mounted display 1102. Alternatively, an automated tool may place insert 104 into opening 108 formed by strap 106 that is coupled to head-mounted display 1102.

At step 1220 in FIG. 12, a cranial brace may be attached to the insert. For example, a user may attach cranial brace 102 to insert 104 by way of a set of magnets and/or ferromagnetic materials incorporated into cranial brace 102 and/or insert 104. Alternatively, an automated tool may attach cranial brace 102 to insert 104 by way of magnets and/or ferromagnetic materials. In either case, once attached, cranial brace 102 may rest against the back of the user's head when the user is wearing head-mounted display 1102 on his or her face 1104.

Additionally or alternatively, the user and/or automated tool may place a separate weight in cranial brace 102 or insert 104 and/or between cranial brace 102 and insert 104. Upon doing so, the user and/or automated tool may attach cranial brace 102 and insert 104 to one another.

At step 1230 in FIG. 12, a force may be applied at the back of the user's head by way of a weight that is incorporated into the cranial brace and/or the insert. For example, a user may put head-mounted display 1102 on his or her face 1104 and wrap strap 106 around the back of his or her head 1106 to hold head-mounted display 1102 in the correct position. In this example, cranial brace 102 and/or insert 104 (and optionally an additional weight) may represent and/or form a removable counter-balance accessory. This accessory may be designed to at least partially counter-balance the weight of head-mounted display 1102 when the user is wearing head-mounted display 1102 to view virtual content.

In some examples, at least a portion of the removable counter-balance accessory may supply and/or provide weight that applies a downward force at the back of the user's head 1106. In such examples, this force may at least partially counter-balance the weight of head-mounted display 1102 on the user's face 1104, thereby potentially improving the user's comfort level during his or her virtual reality experience.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The foregoing description, for purposes of explanation, has been described with reference to specific embodiments and has been provided to enable others skilled in the art to best utilize various aspects of the example embodiments disclosed herein. However, the illustrative discussions above are not intended to be exhaustive or to limit the scope of the claims to the precise forms disclosed. Many modifications and variations are possible in view of the above teachings without departing from the spirit and scope of the instant disclosure. The instant disclosure covers all modifications, equivalents, and alternatives falling within the scope of the appended claims. Features from any of the above-mentioned embodiments may be used in combination with one another in accordance with the general principles described herein. The embodiments were chosen to best explain the principles underlying the claims and their practical applications, to thereby enable others skilled in the art to best use the embodiments with various modifications as are suited to the particular uses contemplated. The embodiments disclosed herein should be considered in all respects illustrative and not restrictive. Reference should be made to the appended claims and their equivalents in determining the scope of the instant disclosure.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind." Unless otherwise noted, the terms "connected to," "coupled to," and "attached to" (and their derivatives), as used in the specification and claims, are to be construed as permitting both direct and indirect (i.e., via other elements or components) connection. Furthermore, two or more elements may be coupled together with an adhesive, a clasp, a latch, a hook, a link, a buckle, a bolt, a screw, a rivet, a snap, a catch, a lock, or any other type of fastening or connecting mechanism.

What is claimed is:

1. A removable counter-balance accessory comprising: a removable cranial brace that rests against the back of a user's head when the user is wearing a head-mounted display on the user's face; an insert that: fits in an opening formed by a strap that wraps around the back of the user's head to hold the head-mounted display on the user's face; attaches, by a magnetic fastener, to the removable cranial brace through the opening formed by the strap; secures the removable cranial brace to the strap at the back of the user's head; and includes a tapered side wall dimensioned to ensure that the insert is inserted within the opening to a preferred depth; and at least one removable weight that applies, in connection with the removable cranial brace at the back of the user's head, a force that counter-balances the weight of the head-mounted display on the user's face.

2. The removable counter-balance accessory of claim 1, wherein at least a portion of the removable weight is integrated into the removable cranial brace.

3. The removable counter-balance accessory of claim 1, wherein at least a portion of the removable weight is integrated into the insert.

4. The removable counter-balance accessory of claim 1, wherein the removable weight comprises a removable unit that is held at the back of the user's head by at least one of:
    the removable cranial brace; or
    the insert.

5. The removable counter-balance accessory of claim 1, wherein the removable weight comprises at least one of:
    a weighted object;
    a battery; or
    an electronics assembly.

6. The removable counter-balance accessory of claim 1, wherein the removable cranial brace and the insert reside on opposite sides of the strap when attached to each other by the magnetic fastener.

7. The removable counter-balance accessory of claim 1, wherein:
    the insert comprises at least one raised segment; and
    the removable cranial brace defines at least one recess dimensioned to house the raised segment of the insert when the removable cranial brace and the insert are attached to each other by the magnetic fastener.

8. The removable counter-balance accessory of claim 1, wherein the insert is integrated into the removable cranial brace.

9. The removable counter-balance accessory of claim 1, further comprising a cushion that is attached to the removable cranial brace and resides between the removable cranial brace and the back of the user's head when the user is wearing the head-mounted display.

10. A head-mounted-display system comprising: a head-mounted display; a strap that is coupled to the head-mounted display and wraps around the back of a user's head when the user is wearing the head-mounted display; a removable counter-balance accessory comprising: a cranial brace that rests against the back of the user's head when the user is wearing the head-mounted display on the user's face; an insert that: fits in an opening formed by the strap; attaches, by a magnetic fastener, to the removable cranial brace through the opening formed by the strap; secures the cranial brace to the strap at the back of the user's head; and includes a tapered side wall dimensioned to ensure that the insert is inserted within the opening to a preferred depth; and at least one weight that applies, in connection with the cranial brace at the back of the user's head, a force that counter-balances the weight of the head-mounted display on the user's face.

11. The head-mounted-display system of claim 10, wherein at least a portion of the weight is integrated into the cranial brace.

12. The head-mounted-display system of claim 10, wherein at least a portion of the weight is integrated into the insert.

13. The head-mounted-display system of claim 10, wherein the weight comprises a removable unit that is held at the back of the user's head by at least one of:
    the cranial brace; or
    the insert.

14. The head-mounted-display system of claim 10, wherein the weight comprises at least one of:
    a weighted object;
    a battery; or
    an electronics assembly.

15. The head-mounted-display system of claim 10, wherein the cranial brace and the insert reside on opposite sides of the strap when attached to each other by the magnetic fastener.

16. A method comprising: placing an insert in an opening formed by a strap that is coupled to a head-mounted display, wherein a tapered side wall of the insert ensures that the insert is inserted within the opening to a preferred depth; attaching, to the insert by a magnetic fastener through the opening formed by the strap, a removable cranial brace that rests against the back of a user's head when the user is wearing the head-mounted display on the user's face; and applying, by way of a removable weight that is incorporated into at least the removable cranial brace or the insert, a force that counter-balances the weight of the head-mounted display on the user's face.

* * * * *